(12) United States Patent
Hambleton et al.

(10) Patent No.: US 6,178,404 B1
(45) Date of Patent: Jan. 23, 2001

(54) SYSTEM AND METHOD TO FACILITATE SPEECH ENABLED USER INTERFACES BY PROMPTING WITH POSSIBLE TRANSACTION PHRASES

(75) Inventors: Myra Hambleton; Eric Weeren, both of Plano, TX (US)

(73) Assignee: InterVoice Limited Partnership, Reno, NV (US)

( * ) Notice: Under 35 U.S.C. 154(b), the term of this patent shall be extended for 0 days.

(21) Appl. No.: 09/360,000

(22) Filed: Jul. 23, 1999

(51) Int. Cl.[7] .................................................. G10L 15/22
(52) U.S. Cl. ...................... 704/275; 704/257; 379/88.16
(58) Field of Search ................................. 704/200, 275, 704/270, 257, 255; 379/88.01, 88.14, 88.17, 88.16, 88.18, 917; 345/3, 333, 335

(56) References Cited

U.S. PATENT DOCUMENTS

| | | | |
|---|---|---|---|
| 4,829,423 | * 5/1989 | Tennant et al. | 704/8 |
| 5,660,176 | 8/1997 | Iliff | 600/300 |
| 5,680,511 | 10/1997 | Baker et al. | 704/257 |
| 5,802,526 | 9/1998 | Fawcett et al. | 707/104 |
| 5,806,021 | 9/1998 | Chen et al. | 704/9 |
| 5,912,952 | * 6/1999 | Brendzel | 379/93.25 |

OTHER PUBLICATIONS

International Search Report PCT/US99/16578.

* cited by examiner

*Primary Examiner*—David R. Hudspeth
*Assistant Examiner*—Donald L. Storm
(74) *Attorney, Agent, or Firm*—Fulbright & Jaworski L.L.P.

(57) ABSTRACT

The invention relates to a voice enabled user interface which correlates, at development time or at run time, utterances, by a caller who is interacting with the user interface, with transaction phrases in a transaction phrase data structure, such as through the use of synonyms, descriptions of the transactions, comparing selected words, and phrases having one or a plurality of word in common. The user interface employs the results of the correlation to calculate an offering to the caller which may include a list of transaction phrases, a list of correlation results, a prompt for the caller to speak additional information to the user interface, or a combination of the two. The user interface may assess whether a number of transaction phrases in a determined list is small enough to be suitable for presentation and, if not, enable a correlating step to be repeated to yield a smaller number of transaction phrases in the correlation result. The invention may be employed in a variety of applications including but not limited to banking and other financial applications services.

77 Claims, 6 Drawing Sheets

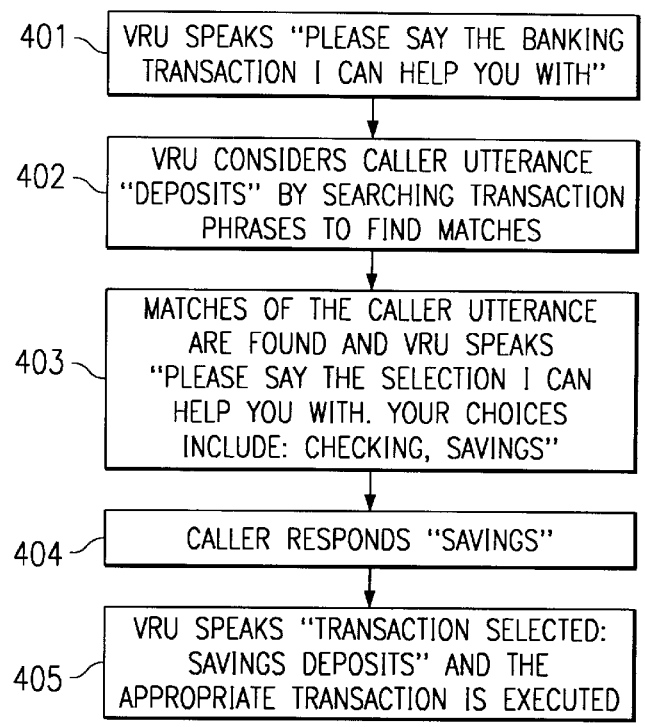
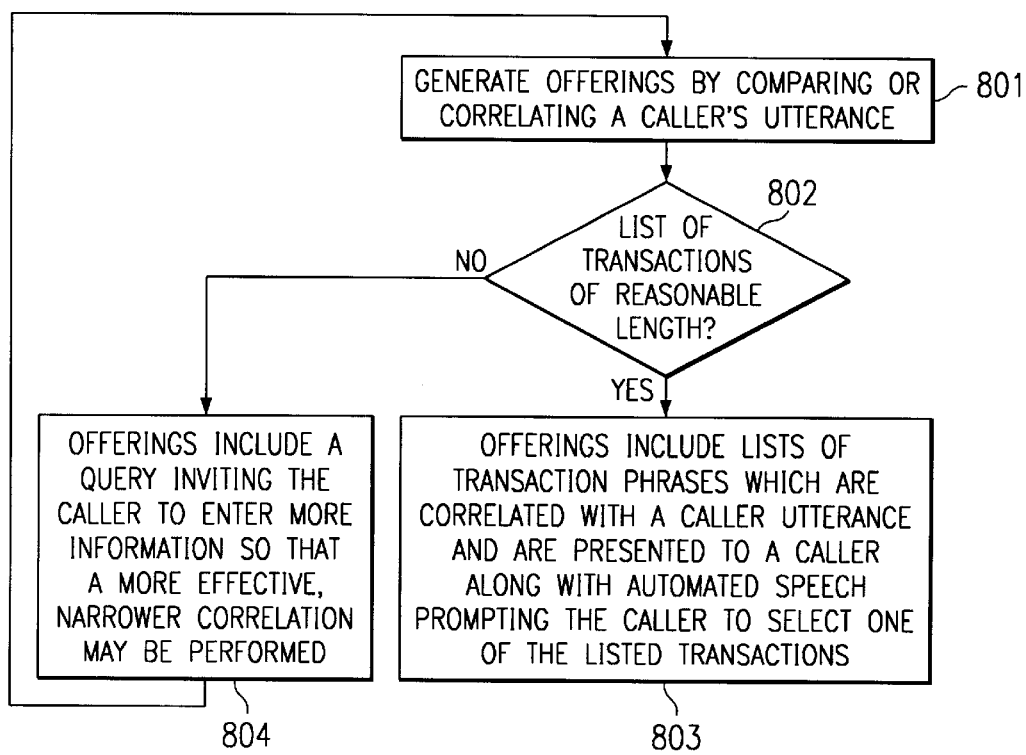

FIG. 6
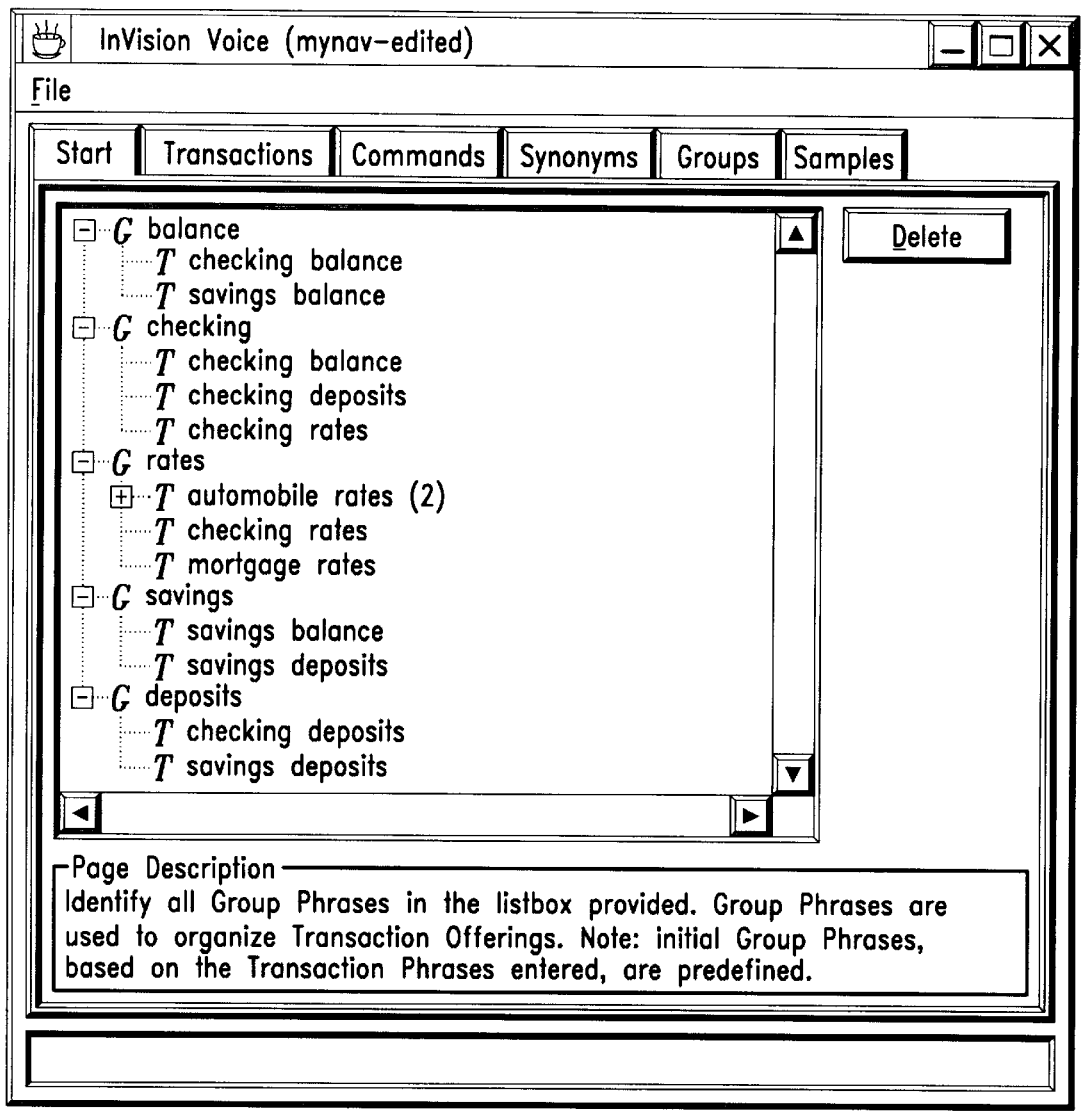
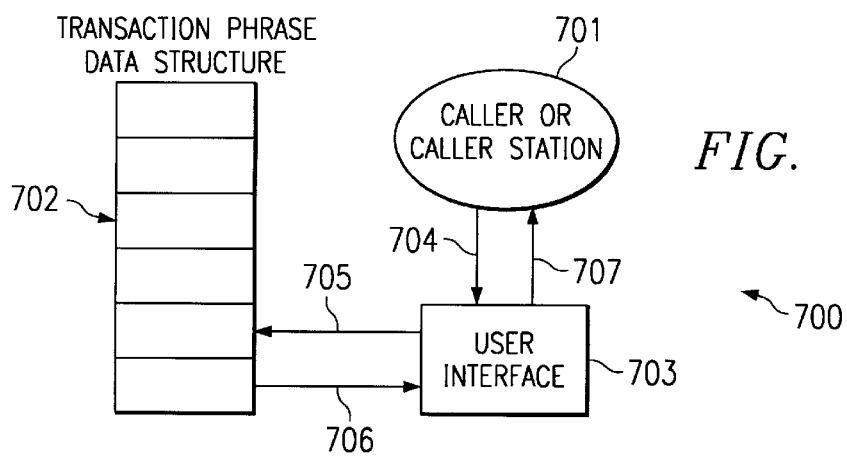
FIG. 7

SYSTEM AND METHOD TO FACILITATE SPEECH ENABLED USER INTERFACES BY PROMPTING WITH POSSIBLE TRANSACTION PHRASES

RELATED APPLICATIONS

Reference is made to the following co-pending and commonly assigned U.S. patent application entitled "VOICE ACTIVATED HYPERLINKS", Ser. No. 08/899952 filed Jul. 24, 1997, the disclosure of which is incorporated herein by reference.

TECHNICAL FIELD

The invention relates in general to a system and method to facilitate speech enabled user interfaces and in particular to automating certain aspects of such a user interface.

BACKGROUND

Today, one prevalent example of speech-enabled user interfaces is a voice response system.

Voice response systems generally permit callers to be connected with automated service which may direct the user through a variety of menu options permitting the user to transmit and receive information to and from a computer system. Applications for such voice response systems including banking and other financial applications, and other operations suitable for automated interaction such as utilities, cable services, and telephone companies. In the banking context, users may dial a designated number and navigate through a set of menu choices permitting the user to receive information such as account balances, the status of various transactions, and possibly to perform financial transactions such as transferring money from one account to another.

Generally, in traditional voice response systems a structured menu has been employed. Such systems present the user with a fixed set of menus with each menu having a specific set of choices as to which function the user would like to perform next. Since the total number of functions in such a system is typically too large to recite to a caller within a single level of menu choices, the menu system is typically structured with a menu hierarchy so as to funnel the uses toward a desired destination activity. For example, if a user wished to determine the current interest rate on a savings account, a first menu may comprise "account information," "general information," and "transfer to customer service" options. Once the user selects "account information" in the first menu, a second menu may present options which include: "checking information", "savings information," and "loan information." The user would then select "savings information" from the second menu. A third menu may then offer a choice including: "savings balance," "savings deposits," "savings withdrawals," and "savings rates."

Speech recognition enabled voice response systems allow callers to verbally submit information to a system instead of using a touch-tone keypad. A simplistic approach to utilizing this technology would involve an application accepting an utterance from a caller naming their desired transaction. This would work well if the caller knows all of the transaction phrases the system supports. A transaction phrase is the word or set of words which identifies a specific action the VRU can perform. For example, "checking balance", "IRA rates", and "savings deposits" are typical transaction phrases for a banking application. However, callers are generally not familiar with the set of transactions the VRU supports or the set of phrases and synonym phrases which the application developer chose to describe the transactions in the application.

There is also a simple method of implementing a speech enabled user interface which involves understanding specific words in place of dual tone multi-frequency (DTMF) keys, however this approach lacks sophistication and flexibility.

A more sophisticated approach to defining an application utilizing speech recognition would be to not only support exact transaction phrases spoken by a caller but to also posses the ability to respond to partial phrases and related words. If the caller has ambiguously identified a desired transaction, the system will preferably offer the caller a list of supported transactions related to the caller's utterance. For example, if the system supports the transactions: "checking rates", "mortgage rates", and "checking balance"; if a caller speaks "rates", the system will offer the choices "checking rates", and "mortgage rates".

However, coding such an application employing the systems of the prior art requires an inordinate amount of time and effort. An example is considered in which an application supports twenty transactions and a comparison is made between its implementation as a touch tone application, a simplistic single input speech application, and a more sophisticated speech application. In the touch tone application implementation, the developer must program the actions for each of the twenty transactions. In addition, one top level menu and three or four sub-menus would generally be created allowing the caller to select their transactions.

In the case of a single input speech application, a developer has to code the actions for each of the twenty transactions. In addition, he has to define a phonetic grammar to recognize the twenty different phrases.

In the case of the more sophisticated speech recognition enabled application, to code the desired application using the existing tools, the developer still has to code the actions for each of the twenty transactions, and he must define the phonetic grammar to recognize the twenty different phrases. Further, he must add to the grammar the partial phrases and related words and code actions which comprise prompting with a pertinent offering to direct the caller to a transaction which the VRU supports. For an application supporting twenty transactions with two to three words in each phrase and two to three synonyms there would be approximately one hundred additional actions for a developer to code. Obviously, this preferred, sophisticated speech enabled application is more difficult for a developer to code than the touch tone application or a single input speech application.

Therefore, it is a problem in the art that coding a preferred, sophisticated speech recognition enabled application for a voice response system is excessively difficult and time consuming.

SUMMARY OF THE INVENTION

These and other objects, features and technical advantages are achieved by a system and method which include a set of tools to facilitate the creation of such sophisticated speech enabled applications. This set of tools eases the creation of a system where offerings of probable transactions and possible synonyms are derived from the set of application-supported transactions correlated with spoken input from the user.

In a preferred embodiment, the present invention is used to implement a speech enabled VRU. However, it should be appreciated by those skilled in the art that the invention would also be useful for a speech enabled web site and any other speech enabled user interface or voice enabled user interface.

In the following, the term "caller" refers to any person interacting with the user interface providing speech input to the interface employing any available technology including but not limited to: telephone service, Internet connection, or wireless connection. Information output from the user interface need not be in the form of speech but may be in textual, graphical or other format.

Generally, the term "offering" relates to the presentation of a set of options to a user or caller. Each offering comprises one or more probable choices which are made available to the caller representing the next activity the caller will engage in with the voice enabled user interface. This invention dynamically derives an offering phrase by comparing the words or phrases or both words and phrases which the caller has spoken with the defined navigational vocabulary or transaction phrases associated with the application. Voice enabled user interfaces may allow all navigational transaction phrases to be available at all times.

In a preferred embodiment of the present invention, based on a caller's utterances or on anticipated caller utterances, "offerings" are automatically generated to navigate the caller to a desired transaction defined in the application. It is noted that each possible caller utterance may be a single word, a phrase which partially matches a transaction phrase, or a complete phrase which completely matches a transaction phrase.

The present invention can be implemented during development time, at run-time or during a combination of the two. In a preferred embodiment, the invention could be implemented by performing a correlation between a data structure of possible recognizable caller utterances and a data structure of transaction phrases at a development phase and generating a system with a user interface action for each such possible caller utterance. At run-time, the system will respond to a caller utterance with the generated user interface (UI) action including making appropriate offerings determined during the development phase when the caller speaks a partial transaction phrase.

In another preferred embodiment, the inventive system dynamically calculates an offering at run-time by comparing a caller utterance with a data structure containing all defined transaction phrases. Alternatively, an offering may be calculated at any combination of development time and run-time.

Preferably, the correlation may be performed with varying degrees of breadth. Where circumstances indicate that a narrow search is preferable, a correlation can identify only those transaction phrases which contain all terms present in a caller utterance. At the broad end of a set of correlation options, a correlation can identify all transaction phrases which contain any term present in a caller utterance. The present invention may perform a correlation according to either the narrow or broad options outlined above, or at any level of breadth in between the examples of broad and narrow correlation approaches described above.

Preferably, the correlation performed by the present invention of caller utterances to transaction phrases can cover both simple and complex cases. In one embodiment, it would offer to the caller every transaction phrase containing the utterance most recently spoken by the caller. For example, if a VRU supports: "90 day IRA rate", "120 day IRA rate", "IRA balance", and "checking rate", and the caller speaks "IRA," a preferred embodiment of the inventive system would offer "90 day IRA rate", "120 day IRA rate", and "IRA balance." If the caller then speaks "rate," a preferred embodiment system would offer "90 day IRA rate", "120 day IRA rate", and "checking rate" as options to the caller.

In another embodiment, the correlation performed by the present invention would preferably determine offerings based on multiple utterances spoken by the caller by accumulating terms present in successive caller utterances. Where, for example, a VRU supports the transactions: "90 day IRA rate", "120 day IRA rate", "IRA balance", "checking rate", if the caller speaks "IRA", a preferred embodiment system will offer "90 day IRA rate", "120 day IRA rate", and "IRA balance". If the caller then speaks "rates," a preferred embodiment system would then offer "90 day IRA rate" and "120 day IRA rate," but would not offer "checking rate" because of the caller's earlier "IRA" utterance.

In yet another embodiment, the offering to the caller would a considered automated choice between responding to the immediate utterance and responding to the historic series of utterances.

In a preferred embodiment, the invention may generate offerings of widely varying scope. Where a list of transactions is of reasonable length, offerings may include lists of transaction phrases which were correlated with a caller utterance which are presented to a caller along with automated speech prompting the caller to select one of the listed transactions. Alternatively, the invention may generate offerings which issue a query inviting the caller to enter more information so that a more effective, possibly narrower correlation may be performed. Such a query may be appropriate where, for instance, an initial caller utterance generates a correlation with an excessively large number of transaction phrases. A caller utterance in response to the query can be added to previous caller utterances so as to generate a narrower correlation likely yielding a smaller number of matching transaction phrases.

The offering of probable transactions as generated by the inventive system can cover both simple and complex cases. In the simplest case, it would offer the full phrase. For example, if the VRU supports the transactions: "checking balance", "savings balance", "checking rates", and "savings deposits", and if the caller speaks "checking", a preferred embodiment system would offer the full phrases "checking balance" and "checking rates" in response. In an alternative embodiment of the present invention, the system would offer only the non-uttered portion of the phrases which, in the above example, would lead to offering the partial phrases "balance" and "rates".

In an alternative embodiment of the present invention, the system would offer single phrases representing multiple probable transactions. For example, the VRU supports transactions: "90 day IRA rate", "120 day IRA rate", "IRA balance", "checking rate", "90-day CD rate", and "120 day CD rate." If the caller speaks "rate," the system according to an alternative embodiment of the present invention would then offer "IRA rate", "CD rate", and "checking rate". In an alternative embodiment, the system could also offer "IRA", "CD", and "checking."

In the following, synonyms refer to words related to other words by variety of mechanisms including but not limited to: being a standard English language synonym of another word, being a term known in the art of a particular industry as being related to another word, and a word which, due to immediate circumstances, such as a company-specific advertising effort, is understood to be closely related to another word or concept. Further, phrases may be synonyms of other entire phrases in addition to merely containing individual words which are synonymous words in the other phrase. In this application, the synonymous relationships between phrases include but are not limited to the same synonymous relationships described above in connection with individual words. Although the phrase "English language synonym" was used above in discussing the meaning of "synonym" in this application, word associations the kind described above, and the invention as a whole are not restricted to use of the English language. All spoken languages could have word associations created as described above and all such languages are intended to be within the scope of the present invention.

In this application, a phrase is one or more words in sequence.

In a preferred embodiment, the invention may advantageously employ synonyms of a caller utterance to conduct a broader search of the transaction phrases by correlating synonyms of the caller utterance as well as the caller utterance itself with words and phrases in the transaction phrase data structure. Further, the invention can identify synonyms of the transaction phrases while correlating caller utterances and synonyms of caller utterances with the transaction phrase data structure thereby further increasing the likely number of matching phrases identified in the correlation. Also, in an offering to the caller, the invention may either employ terms originally present in the caller utterance, synonyms of such terms, or synonyms of the utterance as a whole. Speaking synonyms of caller utterances to the caller in an offering may be used advantageously to, more effectively guide the caller to a desired transaction.

In a preferred embodiment, the invention may deal with synonyms in a variety of ways. For example, the VRU supports the transactions: "checking balance", "savings balance" and "checking rates". The term "checking" has the synonym "green account"; if the caller speaks "green account", a preferred embodiment system would then offer "checking rate" and "checking balance". Alternatively, the system might instead offer "green account rate" and "green account balance."

Variation in the order of terms as well as synonyms may be included in transaction phrases in order to help generate matches between transactions and caller utterances. For example, the utterances "balance of checking account," "account balance of checking", "account balance", and "balance of checking" may all be linked with the transaction "checking balance." The transaction phrases defined by the developer form the data structure through which the inventive system searches in order to correlate caller utterances with appropriate transaction phrases.

In another preferred embodiment, the VRU supports the transactions: "checking balance" "savings rates", and "IRA accrued interest." The synonym for "checking balance" is "XYZ value" and the synonym for "IRA accrued interest" is "XYZ accrual." If the caller enters or speaks "XYZ", a preferred embodiment system would offer "balance" and "accrual"; it could offer "XYZ value" and "XYZ accrual"; or it would perhaps offer "checking balance" and "IRA accrued interest".

In a preferred embodiment of the present invention, treatment by the system of the possible synonyms also provides variation in possible sources of synonyms. Sources include but are not limited to: developers assigning synonyms to individual transaction phrases, developers assigning synonyms to groups of transaction phrases, computer based thesauruses, and databases.

Therefore, it is an advantage of an embodiment of the present invention that coding a sophisticated speech recognition user interface can be accomplished with less effort and less required expertise on the part of a developer than those available in prior art systems.

It is a further advantage of an embodiment of the present invention that entry of synonyms by a caller does not cause increased complication for a developer in creating a sophisticated speech recognition enabled user interface.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIGS. 4A and 4B depicts examples of the association of caller utterances with offerings to be generated in response to such utterances according to a preferred embodiment of the present invention;

FIG. 6 depicts groupings of phrases with common terms according to a preferred embodiment of the present invention;

FIG. 7 depicts a conceptual representation of a relationship between functional elements of a speech enabled user interface according to a preferred embodiment of the present invention; and FIG. 8 depicts operation of a preferred embodiment of the present invention with respect to different lengths of transaction phrase lists.

DETAILED DESCRIPTION

Figure 1:
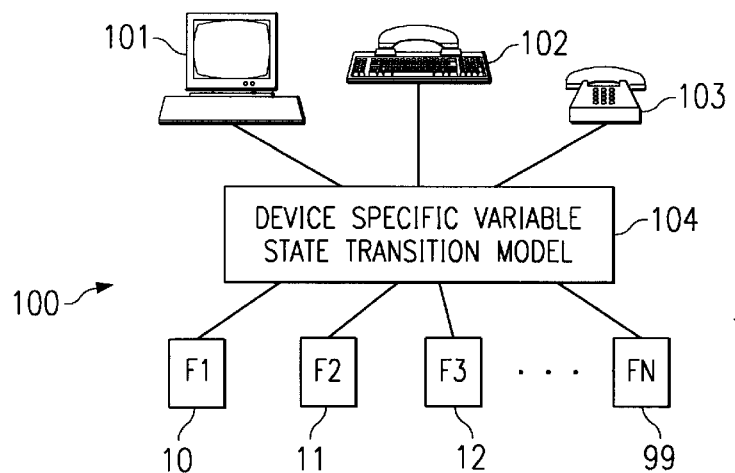
FIG. 1 depicts a system suitable for implementing a preferred embodiment of the present invention.

FIG. 1 depicts a system suitable for implementing a preferred embodiment of the present invention. Invision software may be employed to develop an application, and Isoft™ software may be employed to run the system depicted in FIG. 1, said software being available from Intervoice Inc., 17811 Waterview Parkway, Dallas, Tex. 75252.

Figure 2:
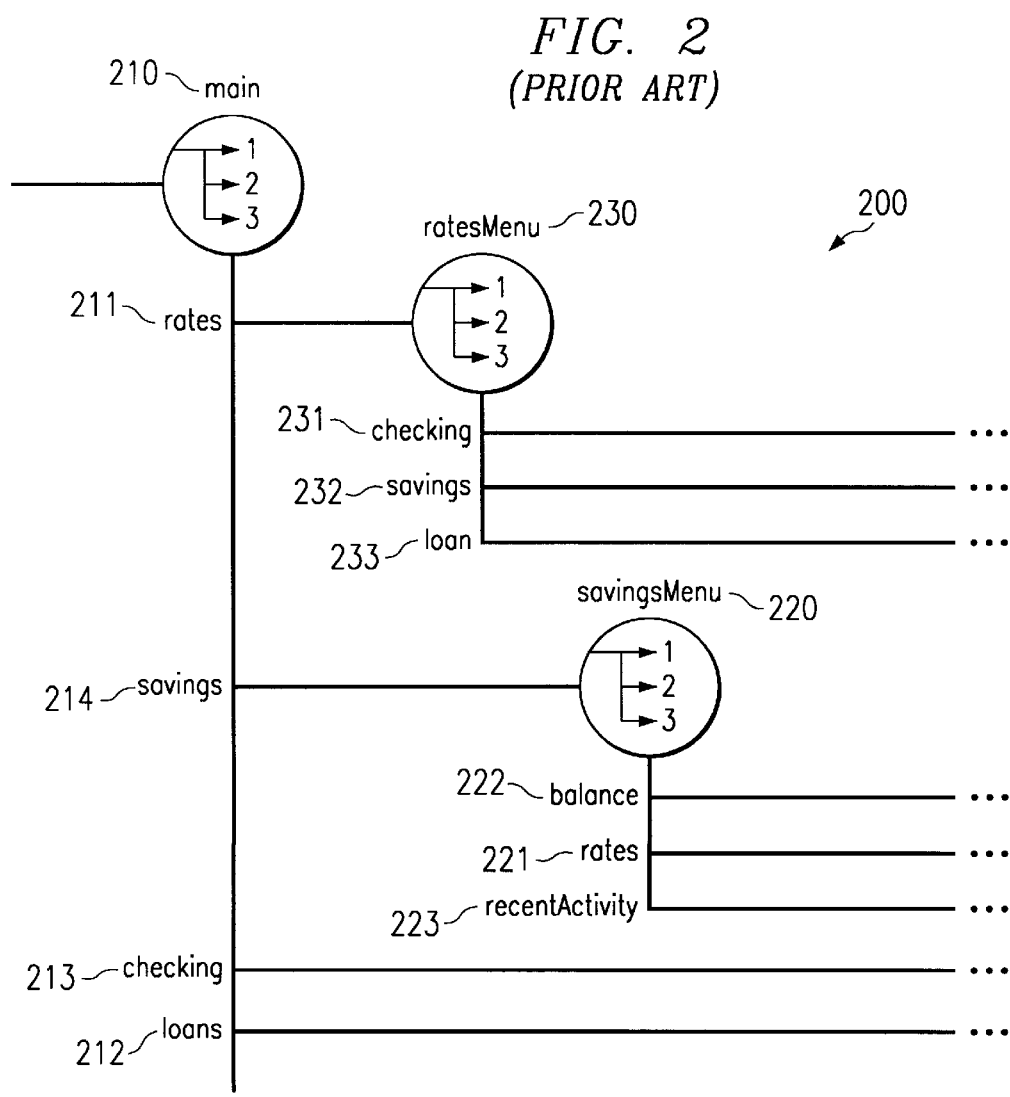
FIG. 2 is a diagram of a development environment and a portion of a call flow structure of the prior art.

FIG. 2 is a diagram of a development environment and call flow structure of the prior art. Either DTMF keys or spoken words may be employed to navigate through the menu in FIG. 2. The DTMF keys are indicated by circles containing the selections 1, 2, and 3, such circles being present for each of the main, rates, and savings menus.

In the following, an example is considered wherein spoken words are used to navigate through the menu. It can be readily seen that each of menus 210, 220, and 230 offer a fixed set of functions or transactions to the caller. For example, to determine recent activity in one's savings account, a caller would speak the word "savings" 214 when prompted by the main menu 210, and then "recent activity" 223 when prompted by the savings menu 220.

The main menu 210 includes four choices: rates 211, savings 214, checking 213, and loans 212. All four choices lead to subsequent menus each containing a plurality of sub-menu selections. The "rates menu" 230 and the "savings menu" 220 are shown in FIG. 2. The dotted lines leading to the right from main menu choices 213 (checking) and 212 (loans) represent additional possible layers of sub-menus which could be arrived at by selecting choices 213 or 212. The sub-menus associated with main menu choices 212 and 213 are not necessary for the purpose of illustrating certain relevant characteristics of prior art call flow systems and have therefore been omitted from FIG. 2.

Figure 3:
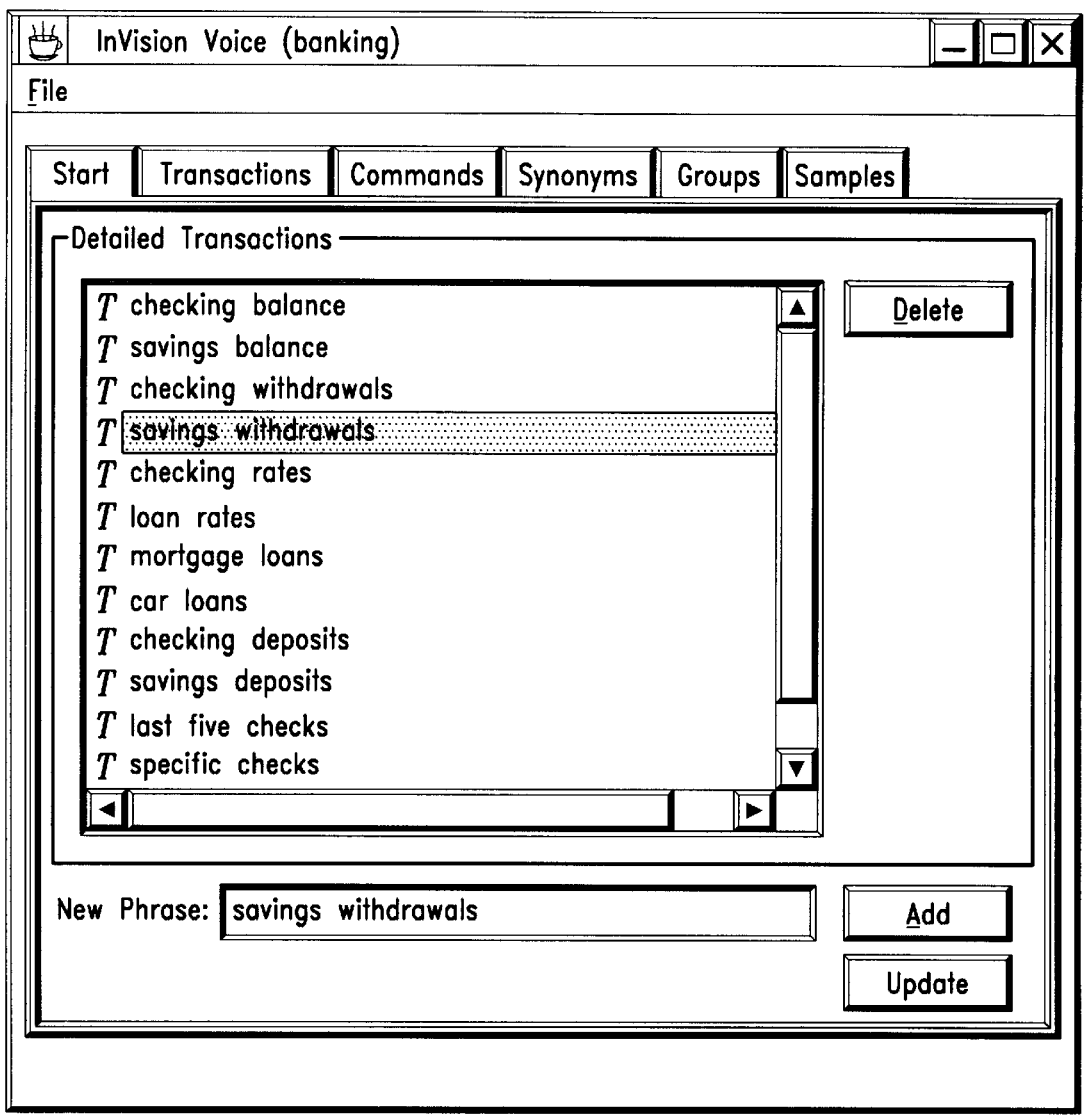
FIG. 3 depicts an input screen which a developer would use to define all known transaction phrases for a speech enabled user interface according to a preferred embodiment of the present invention.

FIG. 3 depicts an input screen which a developer would use to define transaction phrases representing all known transactions supported by a voice enabled user interface according to a preferred embodiment of the present invention. A transaction may be associated with more than one transaction phrase in order to accommodate anticipated variation in the utterances a caller might speak to refer to a particular transaction. For example, a transaction which presents "savings interest rate" may be associated with several transaction phrases including but not limited to: "investment interest rate," and "long term interest rate," in addition to the literal expression "savings interest rates."

Figure 4A:
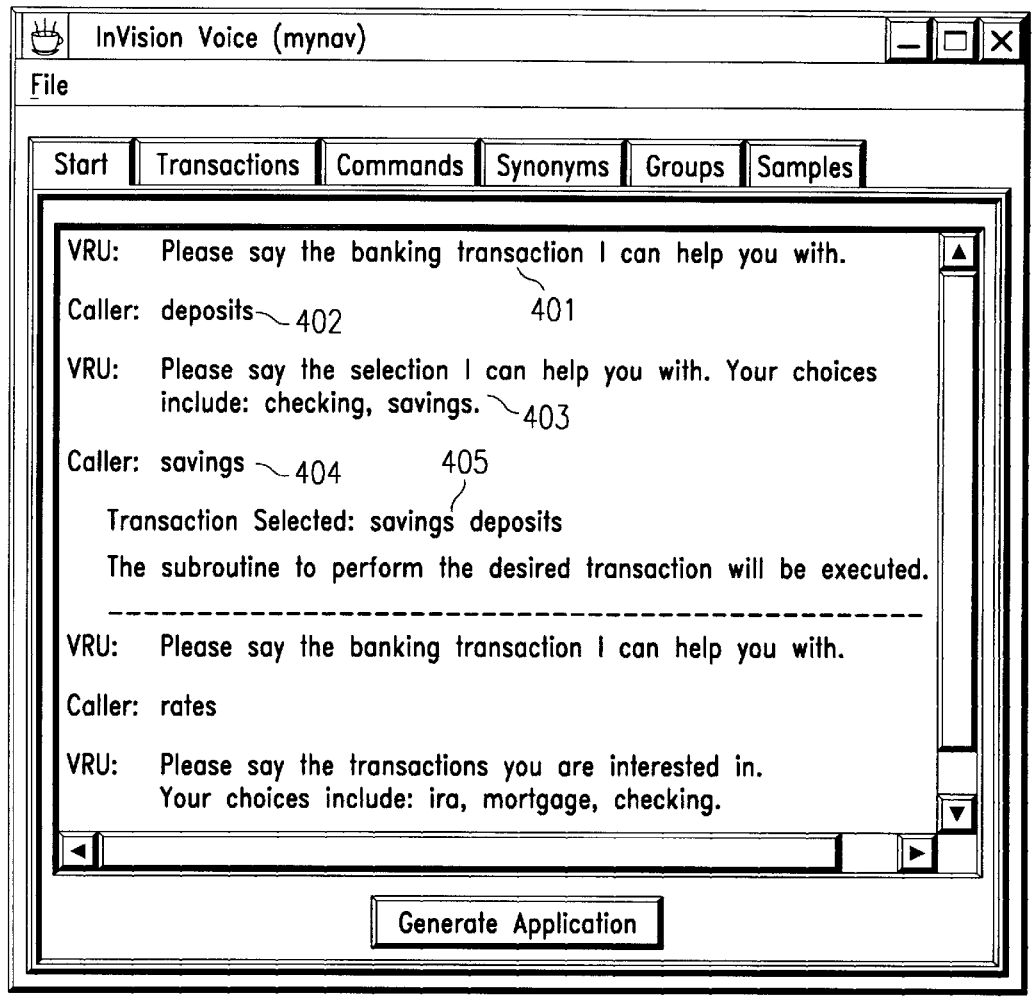

FIGS. 4A and 4B depict examples of the run-time behavior of a system developed with or using the inventive system showing offerings responsive to caller utterances according to a preferred embodiment of the present invention.

In a preferred embodiment, the ultimate generation of offerings is preferably accomplished during run-time of the system by correlating terms in the caller utterances to terms found in the transaction phrases. Generation of the offerings requires that the system combine the results of correlating caller utterances with transaction phrases in the data structure with words to be spoken to the caller so as to generate an interactive conversation between the caller and the voice enabled user interface.

A description of example navigational conversations depicted in FIGS. 4A and 4B follows. The examples illustrate how an application using the inventive system would respond to specific input from the caller. At step 401, the system plays a standard phrase to prompt the caller to speak a transaction request. At step 402, the case of caller utterance of the word "deposits" is considered. Utterance of the term "deposits" by the caller causes the inventive system to search through the transaction phrases to find matches. According to element 403, matches are found which relate to both checking and savings accounts. At step 403, a navigational conversation is depicted which invites the caller to speak terms which will further refine the search or correlation. In this case, the system will ask the caller to select between checking and savings accounts in order to identify a desired transaction.

At step 404, the case of a caller responding with the term "savings" is depicted. At step 405, the navigational message "transaction selected: savings deposits" may be spoken by the voice enabled user interface, and the appropriate transaction is executed to provide the selected information to the caller.

The above example illustrates how the invention preferably provides for a response to the particular case of a caller speaking the term "deposits". Because the term "deposits" does not correspond exactly with a transaction phrase, the system looks for partial matches and finds two such partial matches. The system then preferably presents options to the caller to guide the interactive conversation toward the final transaction which is "savings deposits."

In a preferred embodiment, much of each navigational message may be generic. The correlation results phrases, or portions thereof, may be combined with the generic portion of the navigational message so as to direct smooth flowing dialogue to the caller which is nevertheless tailored to the specific correlation result acquired from the transaction phrase data structure. Further, there may be several such generic messages to provide variety in the offering wording.

In another preferred embodiment, the inventive system creates a data structure containing predicted caller entries or utterances which anticipates possible caller utterances which might occur during run-time and establishes a correlation between specific predicted caller utterances and matching transactions at the development phase of the system. The caller utterances are referred to as "prospective" because, generally, during the development phase, no actual caller entries are available. This data structure is preferably known as the predictive caller entry data structure. The predictive caller entry data structure preferably includes entries comprising individual words, phrases which partially match transaction phrases, and phrases which exactly match transaction phrases.

The caller entry data structure may also include words or phrases which do not fully or partially match any transaction phrases but which the developers may have reason to expect will be entered by a prospective caller. Entries which don't match any transaction phrases are preferably linked to an offering informing the caller that the system doesn't support such transactions and directing the caller to enter a different word or phrase.

The system also links the predicted caller entries or utterances in the predictive caller entry data structure to appropriately selected automated spoken messages which are matched to the content of the caller utterance and the transactions to which the caller utterance is correlated. Offerings are then calculated for each of the prospective caller entries in the predictive caller entry data structure or database. The offerings may include but are not limited to: lists of transactions from which a prospective caller may choose a desired transaction and queries intended to elicit information from a prospective caller to more accurately focus the search for the caller's desired transaction. Preferably, offerings are calculated for each of the predicted caller entries in the predictive caller entry data structure, and the resulting offerings stored in an offering data structure or database.

With this preparation in place, response to actual caller entries or utterances at run-time is preferably simplified. At run-time, a caller utterance is compared to the contents of the predictive caller entry data structure. If a match is found with this data structure, the system accesses the offering associated with the matched entry in the predictive caller entry data structure and plays it for the caller. The system is thereby preferably spared the need to calculate the offering at run time.

This embodiment involves additional preparation at the development phase thereby enabling the system to respond more rapidly to anticipated caller utterances at run time since the offerings have already been determined and need be calculated in real time. Establishing the correlations and calculating the offerings for various possible caller utterances at the development phase presents the advantage of more rapid system operation at run-time. Additional memory may be required however to store information pertaining to the anticipated caller entries, their respective correlations with the transaction phrase data structure, and the offerings to be played or spoken to the caller.

In a preferred embodiment, any required breadth for a correlation between caller utterances and transaction phrases is provided by the terms present in the transaction phrase data structure depicted in FIG. 3. The terms defined in the transaction phrase data structure preferably include various permutations of the order of relevant words as well as synonyms of anticipated caller spoken terms. In this manner, word mapping and association are inherently built in to the data structure. This incorporation of word mapping into the data structure provides breadth for a word search independent of any synonym searching facility in the voice enabled user interface. A correlation may then conduct straightforward word comparison operations or may incorporate synonym searching if further search breadth is sought.

The mechanism for responding to caller queries will be hereinafter referred to as the navigational conversation engine. The conversation engine generates navigational phrases to help guide the caller to a valid destination caller transaction—the transaction the caller wishes to have executed by the user interface. In the simplest case, the phrase spoken by a caller may closely or precisely match an actual caller transaction. In this case, the caller may simply be asked to verify that the matched phrase/transaction is the one the caller wishes to perform. A more complicated case arises where several caller transactions, as represented by phrases in the caller transaction phrase data structure, are found to match the caller utterance. As long as the number of matches between the caller utterance and the transaction phrase database is sufficiently short for an average caller to remember, the navigational conversation engine may present the various matched transactions to the caller at which point the caller may be prompted to select one of the presented transactions.

In a preferred embodiment, where the caller utterance does not precisely match the entirety of a transaction phrase, the system will search through all the transaction phrases to find matches for individual terms present in the caller utterance. For example, if the caller spoke the word "deposits," the user interface would respond with all transaction phrases which contain the word "deposits." In the case of the example depicted in FIGS. 4A and 4B, transaction phrases which contain the word "deposits" are "savings deposits" and "checking deposits". The navigational conversation engine would then logically present the option of choosing between "savings deposits" and "checking deposits". Appropriate introductory words can be added for the purpose of presenting a complete and grammatically correct sentence. The result generated in FIGS. 4A and 4B is "please say the selection I can help you with, your choices include: checking, savings". (The term"deposits" is assumed to be qualified, because of the context of the discussion, by the two terms presented.)

Where more than one word is spoken, the selection of transaction phrases to offer as options in the navigational conversation may become more complex. A spectrum of possibilities as to the breadth or narrowness of the search is available depending upon the terms spoken, and the frequency with which such terms are used among the transaction phrases, and all such embodiments are considered to be within the scope of the present invention. In an alternative embodiment, the speech enabled user interface may choose to omit certain terms found in the caller entered text, or caller spoken words, from the comparison/search process. For example, extremely common terms such as "bank," "account," and "money" may be ignored so as to concentrate on entered terms which more effectively narrow the focus of the search or correlation.

Once the terms to be considered are selected, a number of approaches remain available. In a preferred embodiment, at the most restrictive end of the spectrum, the user interface could select as matches only those transaction phrases which contain all the terms selected for searching purposes. Thus, if the caller spoke the phrase "retirement savings," the system would select as options those transaction phrases containing both the terms "savings" and "retirement."

At the broadest end of the spectrum, the speech enabled user interface could select as matches, all transaction phrases which contain either of the search terms. Thus, continuing with the most recent example, with this broad search mode, the speech enabled user interface would select as options all transaction phrases which contain either the term "savings" or the term "retirement."

In a preferred embodiment, synonyms of the terms "retirement" and "savings" will have been defined as transaction phrases, or incorporated into transaction phrases, during the development phase, thereby providing for built in word mapping within the transaction phrase data structure. However, the user interface could be enabled to look for synonyms of the caller spoken terms in the transaction phrases thereby effectively looking for synonyms of synonyms and still further broadening the resulting correlation. Such an approach may be helpful in the event that a caller spoken term which is synonymous with a transaction was inadvertently omitted from the transaction phrases, or if the caller spoken term is sufficiently remote in its normal English meaning from the transaction that no definition was entered into the transaction phrases for it at the development stage.

In a preferred embodiment, the process of generating navigation phrases to lead the caller to a desired transaction need not be completed in a single iteration. Where the terms spoken by the caller are numerous, complex, difficult to associate with known terms, or a combination of the foregoing, the speech enabled user interface will preferably conduct a sequence of navigation conversations with the caller so as to arrive at a destination transaction.

In a preferred embodiment, within a given conversation, the system stores successive caller entries so as to have an accumulation of terms with which to search through a database or other data structure as a conversation between the user interface and the caller progresses. This accumulation of terms arises as the user interface prompts the caller to speak additional utterances. Accumulation of words or terms contained in successive caller utterances can help build a caller utterance vocabulary which can expand as successive caller utterances add terms to the vocabulary. This caller utterance vocabulary can aid the user interface in achieving narrower correlation results, generally meaning correlation results with fewer matching transaction phrases. The user interface, of course, need not use all terms present in the caller utterance vocabulary in any one correlation. The user interface may, however, optionally use a greater number of terms as the caller utterance vocabulary grows. The caller utterance vocabulary preferably grows only when an ongoing search is being progressively refined and is preferably erased when a completely new search is initiated.

For example, if the caller had uttered "savings" in response to a first system prompt and "rates" in response to a second such system prompt, the system would be able to search for phrases containing both "savings" and "rates" thereby enabling the system to more accurately and narrowly focus the search.

In various cases, the user interface will prompt a caller to speak one choice from a among list of choices, whether the choices are terms which further narrow the search, or transaction phrases which identify actual transaction choices available to the caller. If, in response to such a prompt, a caller utters a remark which does not correspond with any of the choices presented by the system, the system may either return the caller to a starting point and begin the navigation process anew, or it could respond with a relational offering based on the caller's most recent utterance. The following conversation is presented as an example. In the example, VRU refers to "Voice Response Unit."

Caller: "rates"
   VRU: "available rates include: CD, mortgage, loans and automobile"
Caller: "CD"
   VRU: "please select from the following choices: 30-day CD, 60-day CD, and 180 day CD"
Caller: "Loans"
   VRU: "say one of the following choices: home loans, car loans, 30-day CD, 60-day CD, and 180 day CD"

In the above example, the caller utterance "loans" is unresponsive to the choices offered by the system. Being unable to identify a transaction based on the caller's response of "loans," the system generates a new offering based on the term "loans". Alternatively, the system could have returned to a general conversational starting point and provided the caller with a standard introductory prompt in order to generate a completely new navigational conversation.

Figure 5:
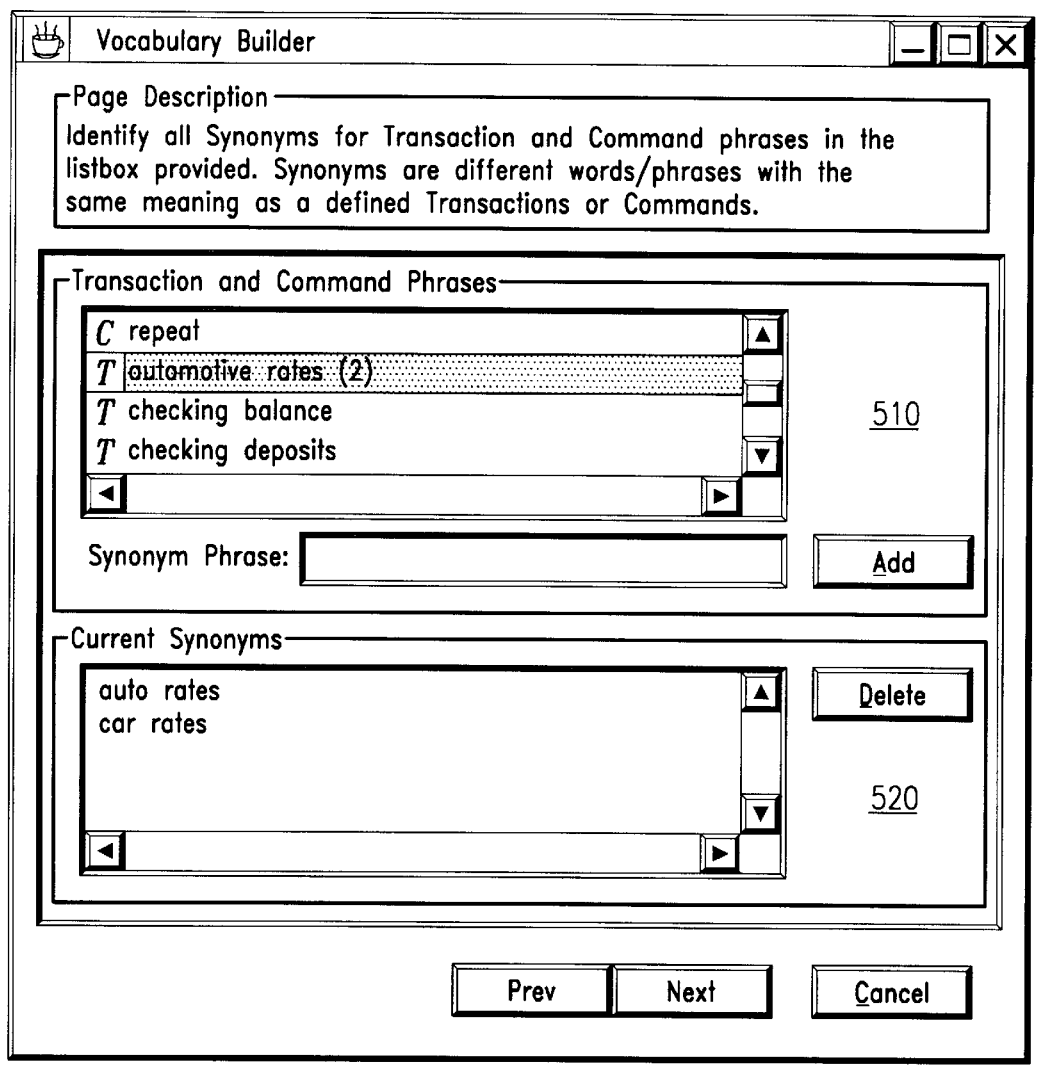
FIG. 5 depicts a vocabulary builder for defining synonyms for transaction phrases according to a preferred embodiment of the present invention.

FIG. 5 depicts a vocabulary builder 500 for defining synonyms 520 for transaction 510 according to a preferred embodiment of the present invention. The vocabulary builder 500 enables a developer to create a synonym list for each transaction in the transaction data structure. Synonyms can be added, deleted, or changed according to the requirements of a particular application. Word association is effectively being created every time a synonym is entered into box 520 for a transaction in box 510. Such word association effectively produces the equivalent of program logic which would have been necessary in the prior art to handle a caller utterance corresponding to a synonym of a transaction phrase. Yet, the considerably greater ease, simplicity, and flexibility of entering synonyms in comparison with having to write code to respond to the utterance of all the listed synonyms highlights an advantage of the present invention.

Element 510 depicts a list of transaction phrases for which synonyms may be entered. Synonyms associated with a currently selected transaction phrase within box 510 are shown in "current synonyms" box 520.

FIG. 6 depicts groupings of phrases with common terms according to a preferred embodiment of the present invention. The list of groups 600 enables a developer to rapidly identify all transaction phrases having a particular term in common. For example, the common term "checking" is found in three phrases: "checking balance," "checking deposits," and "checking rates."

FIG. 7 depicts a conceptual representation 700 of a relationship between functional elements of a speech enabled user interface according to a preferred embodiment of the present invention.

In a preferred embodiment of the present invention, a caller or caller station 701 is in communication with voice enabled user interface 703 which is in turn in communication with transaction phrase data structure 702.

In a preferred embodiment, a sequence of events for a conversation between a caller 701 and the user interface 703 proceeds as follows. The user interface generates an introductory greeting. Caller 701 proceeds to speak a caller utterance 704 to the user interface 703. The user interface proceeds to correlate the caller utterance 704 with transaction phrases in the data structure 702. Element 705 is referred to as a correlation query and is meant to represent whatever terms, phrases, or synonyms thereof the user interface 703 elects to employ in the correlation with phrases in the data structure 702. The selection of such terms and phrases for correlation purposes has been previously discussed in this application and will therefore not be repeated here.

In a preferred embodiment, the correlation operation between the caller utterance 704 and the transaction phrases in the data structure 702 yields correlation result 706, typically consisting of one or more transaction phrases. It is possible that null correlation occurs meaning that the correlation yields no matching transaction phrases. The user interface acquires the correlation result 706 and calculates an offering 707 from it. The User Interface 703 then communicates the offering to the caller 701. Determination of the content of the offering 707 has been discussed previously in this application and therefore, for the sake of brevity, will not be repeated here.

Preferably, the correlation may be performed with varying degrees of breadth. Where circumstances indicate that a narrow search is preferable, a correlation can identify only those transaction phrases which contain all terms present in a caller utterance. At the broad end of a set of correlation options, a correlation can identify all transaction phrases which contain any term present in a caller utterance. The present invention may perform a correlation according to either the narrow or broad options outlined above, or at any level of breadth in between the examples of broad and narrow correlation approaches described above.

In a preferred embodiment, the invention may generate offerings of widely varying scope (step 801 of FIG. 8). Where a list of transactions is of reasonable length (step 802 of FIG. 8), offerings may include lists of transaction phrases which were correlated with a caller utterance which are presented to a caller along with automated speech prompting the caller to select one of the listed transactions (step 803 of FIG. 8). Alternatively, the invention may generate offerings which issue a query inviting the caller to enter more information so that a more effective, possibly narrower correlation may be performed (step 804 of FIG. 8). Such a query may be appropriate where, for instance, an initial caller utterance generates a correlation with an excessively large number of transaction phrases. A caller utterance in response to the query can added to previous caller utterances so as to generate a narrower correlation likely yielding a smaller number of matching transaction phrases.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for facilitating an operation of a speech enabled user interface, the method comprising the steps of:
   creating a transaction phrase data structure comprising transaction phrases representing transactions supported by said speech enabled user interface;
   correlating a caller utterance with one or more of said transaction phrases in said transaction phrase data structure, thereby generating a correlation result including a plurality of transaction phrases having at least one word in common with said caller utterance; and
   calculating an offering directed to a caller based on said correlation result thereby facilitating the operation of said speech enabled user interface.

2. The method of claim 1, wherein said steps of creating, correlating, and calculating are performed at a development phase of said speech enabled user interface.

3. The method of claim 1, wherein said steps of correlating and calculating are performed during run-time of said speech enabled user interface.

4. The method of claim 1, wherein each said transaction phrase is linked to a transaction.

5. The method of claim 4, wherein execution of said transaction comprises speaking a specific message to said caller.

6. The method of claim 4, wherein selected ones of said transaction phrases comprise:
   words which are synonymous with transaction terms.

7. The method of claim 4, wherein selected ones of said transaction phrases are synonymous with phrases describing selected transactions.

8. The method of claim 1, wherein said step of correlating comprises:
   comparing said caller utterance in its entirety with transaction phrases in said data structure.

9. The method of claim 1, wherein said step of correlating comprises:
   comparing selected words of said caller utterance with words in said transaction phrases in said data structure.

10. The method of claim 1, wherein said step of correlating comprises:
    comparing synonyms of selected words in said caller utterance with words in said transaction phrases in said data structure.

11. The method of claim 1, wherein said correlation result comprises:
    a selection of transaction phrases having a plurality of words in common with said caller utterance.

12. The method of claim 1, wherein said correlation result comprises:
    a selection of said transaction phrases, wherein each phrase in said selection comprises a sequence of words which completely matches an entirety of said caller utterance.

13. The method of claim 1, wherein said offering comprises:
    a list of transaction phrases according to said correlation result.

14. The method of claim 13, wherein said offering further comprises:
    selected segments of speech spoken by said user interface.

15. The method of claim 1, wherein said offering comprises:
    a prompt spoken to said caller by said user interface to elicit an additional caller utterance.

16. The method of claim 15, wherein said offering further comprises:
    a list of transaction phrases according to said correlation result.

17. The method of claim 1, wherein said step of calculating comprises:
    determining whether to include a list of transaction phrases in said offering.

18. The method of claim 17, wherein said step of determining comprises:
    assessing whether a number of transaction phrases in said list is small enough to be suitable for presentation to said caller.

19. The method of claim 18, wherein said step of calculating comprises:
    where said number of transaction phrases is too large to be suitable for presentation to said caller,
    including a prompt spoken to said caller by said user interface to elicit an additional caller utterance and thereby enable said step of correlating to be repeated so as to generate correlation result with a reduced number of transaction phrases.

20. The method of claim 1, comprising the further step of:
    wherein a correlation result for an initial caller utterance comprises a number of transaction phrases too large to present to said caller,
    prompting said caller to speak an additional caller utterance to said user interface to enable said step of correlating to be repeated and to yield a smaller number transaction phrases in said correlation result.

21. The method of claim 20, comprising the further step of:
    accumulating words included in said additional caller utterance with words in said initial caller utterance thereby generating an expanded caller utterance vocabulary.

22. The method of claim 21, comprising the further step of:
    repeating said step of correlating employing said expanded caller utterance vocabulary.

23. The method of claim 21, comprising the further step of:
    repeating said step of accumulating and said step of correlating employing said expanded caller utterance vocabulary until a number of transactions in a latest correlation result is small enough to present to said caller.

24. The method of claim 1, further comprising the step of:
    speaking said offering to said caller.

25. The method of claim 1, further comprising:
accumulating terms present in separate successive caller utterances, wherein said correlating a caller utterance includes correlating a plurality of said successive caller utterances.

26. A system for facilitating an operation of a speech enabled user interface, the system comprising:
means for creating a transaction phrase data structure comprising transaction phrases representing transactions supported by said speech enabled user interface;
means for comparing a caller utterance with one or more of said transaction phrases in said transaction phrase data structure, thereby generating a comparison result; and
means for calculating an offering directed to a caller based on said comparison result thereby facilitating the operation of said speech enabled user interface, wherein said offering includes at least one transaction phrase compared with said caller utterance in said comparing step.

27. The system of claim 26, wherein said means for creating, comparing, and calculating are employed at a development phase of said speech enabled user interface.

28. The system of claim 26, wherein said means for comparing and calculating are employed during run-time of said speech enabled user interface.

29. The system of claim 26, wherein each said transaction phrase is linked to a transaction.

30. The system of claim 29, wherein execution of said transaction comprises speaking a specific message to said caller.

31. The system of claim 29, wherein selected ones of said transaction phrases comprise:
words which are synonymous with transaction terms.

32. The system of claim 29, wherein selected ones of said transaction phrases are synonymous with phrases describing selected transactions.

33. The system of claim 26, wherein said means for comparing comprises:
means for comparing said caller utterance in its entirety with transaction phrases in said data structure.

34. The system of claim 26, wherein said means for comparing comprises:
means for comparing selected words of said caller utterance with words in said transaction phrases in said data structure.

35. The system of claim 26, wherein said means for comparing comprises:
means for comparing synonyms of selected words in said caller utterance with words in said transaction phrases in said data structure.

36. The system of claim 26, wherein said comparison result comprises:
a selection of transaction phrases having a single word in common with said caller utterance.

37. The system of claim 26 wherein said comparison result comprises:
a selection of transaction phrases having a plurality of words in common with said caller utterance.

38. The system of claim 26, wherein said comparison result comprises:
a selection of said transaction phrases, wherein each phrase in said selection comprises a sequence of words which completely matches an entirety of said caller utterance.

39. The system of claim 26, wherein said offering comprises:
a list of transaction phrases according to said comparison result.

40. The system of claim 39, wherein said offering further comprises:
selected segments of speech spoken by said user interface.

41. The system of claim 26, wherein said offering comprises:
a prompt spoken to said caller by said user interface to elicit an additional caller utterance.

42. The system of claim 41, wherein said offering further comprises:
a list of transaction phrases according to said comparison result.

43. The system of claim 26, wherein said means for calculating comprises:
means for determining whether to include a list of transaction phrases in said offering.

44. The system of claim 43, wherein said means for determining comprises:
means for assessing whether a number of transaction phrases in said list is small enough to be suitable for presentation to said caller.

45. The system of claim 44, wherein said means for calculating comprises:
where said number of transaction phrases is too large to be suitable for presentation to said caller,
means for including a prompt spoken to said caller by said user interface to elicit an additional caller utterance and thereby enable said means for comparing to be repeated so as to generate a comparison result with a reduced number of transaction phrases.

46. The system of claim 26, further comprising:
wherein a comparison result for an initial caller utterance comprises a number of transaction phrases too large to present to said caller,
means for prompting said caller to speak an additional caller utterance to said user interface to enable said means for comparing to be repeated and to yield a smaller number transaction phrases in said correlation result.

47. The system of claim 46, further comprising:
means for accumulating words included in said additional caller utterance with words in said initial caller utterance thereby generating an expanded caller utterance vocabulary.

48. The system of claim 47, further comprising:
means for repeating said means for comparing employing said expanded caller utterance vocabulary.

49. The system of claim 47, further comprising:
means for repeating said means for accumulating and said means for comparing employing said expanded caller utterance vocabulary until a number of transactions in a latest correlation result is small enough to present to said caller.

50. The system of claim 26, further comprising:
means for speaking said offering to said caller.

51. The system of claim 26, further comprising:
means for accumulating terms present in separate successive caller utterances, wherein said comparing means compares a plurality of said successive caller utterances.

52. A computer program product having a computer readable medium having computer program logic recorded thereon for facilitating an operation of a speech enabled user interface, the computer program product comprising:

a computer readable medium; and computer program logic recorded on said computer readable medium comprising:

code for creating a transaction phrase data structure comprising transaction phrases representing transactions supported by said speech enabled user interface;

code for correlating a caller utterance with one or more of said transaction phrases in said transaction phrase data structure, thereby generating a correlation result; and code for calculating an offering directed to a caller based on said correlation result thereby facilitating the operation of said speech enabled user interface, wherein said offering includes a plurality of transaction phrases correlated with said caller utterance by said correlating code.

53. The computer program product of claim 52, wherein said code for creating, correlating, and calculating are executed at a development phase of said speech enabled user interface.

54. The computer program product of claim 52, wherein said code for correlating and calculating is executed during run-time of said speech enabled user interface.

55. The computer program product of claim 52, wherein each said transaction phrase is linked to a transaction.

56. The computer program product of claim 55, wherein execution of said transaction comprises speaking a specific message to said caller.

57. The computer program product of claim 55, wherein selected ones of said transaction phrases comprise:

words which are synonymous with transaction terms.

58. The computer program product of claim 55, wherein selected ones of said transaction phrases are synonymous with phrases describing selected transactions.

59. The computer program product of claim 52, wherein said code for correlating comprises:

code for comparing said caller utterance in its entirety with transaction phrases in said data structure.

60. The computer program product of claim 52, wherein said code for correlating comprises:

code for comparing selected words of said caller utterance with words in said transaction phrases in said data structure.

61. The computer program product of claim 52, wherein said code for correlating comprises:

code for comparing synonyms of selected words in said caller utterance with words in said transaction phrases in said data structure.

62. The computer program product of claim 52, wherein said correlation result comprises:

a selection of transaction phrases having a single word in common with said caller utterance.

63. The computer program product of claim 52, wherein said correlation result comprises:

a selection of transaction phrases having a plurality of words in common with said caller utterance.

64. The computer program product of claim 52, wherein said correlation result comprises:

a selection of said transaction phrases, wherein each phrase in said selection comprises a sequence of words which completely matches an entirety of said caller utterance.

65. The computer program product of claim 52, wherein said offering comprises:

a list of transaction phrases according to said correlation result.

66. The computer program product of claim 65, wherein said offering further comprises:

selected segments of speech spoken by said user interface.

67. The computer program product of claim 52, wherein said offering comprises:

a prompt spoken to said caller by said user interface to elicit an additional caller utterance.

68. The computer program product of claim 67, wherein said offering further comprises:

a list of transaction phrases according to said correlation result.

69. The computer program product of claim 52, wherein said code for calculating comprises code for determining whether to include a list of transaction phrases in said offering.

70. The computer program product of claim 69, wherein said code for determining comprises:

code for assessing whether a number of transaction phrases in said list is small enough to be suitable for presentation to said caller.

71. The computer program product of claim 70, wherein said code for calculating comprises:

where said number of transaction phrases is too large to be suitable for presentation to said caller, code for including a prompt spoken to said caller by said user interface to elicit an additional caller utterance and thereby enable said code for correlating to be repeated so as to generate correlation result with a reduced number of transaction phrases.

72. The computer program product of claim 52, further comprising:

wherein a correlation result for an initial caller utterance comprises a number of transaction phrases too large to present to said caller, code for prompting said caller to speak an additional caller utterance to said user interface to enable said code for correlating to be repeated and to yield a smaller number transaction phrases in said correlation result.

73. The computer program product of claim 72, further comprising:

code for accumulating words included in said additional caller utterance with words in said initial caller utterance thereby generating an expanded caller utterance vocabulary.

74. The computer program product of claim 73, further comprising:

code for repeating said code for correlating employing said expanded caller utterance vocabulary.

75. The computer program product of claim 73, further comprising:

code for repeating said code for accumulating and said code for correlating employing said expanded caller utterance vocabulary until a number of transactions in a latest correlation result is small enough to present to said caller.

76. The computer program product of claim 49, further comprising:

code for speaking said offering to said caller.

77. The computer program product of claim 52, further comprising:

code for accumulating terms present in separate successive caller utterances, wherein said code for correlating a caller utterance includes correlating a plurality of said successive caller utterances.

* * * * *